March 6, 1951   O. JACOBSEN   2,544,090
PLUG VALVE
Filed June 24, 1944
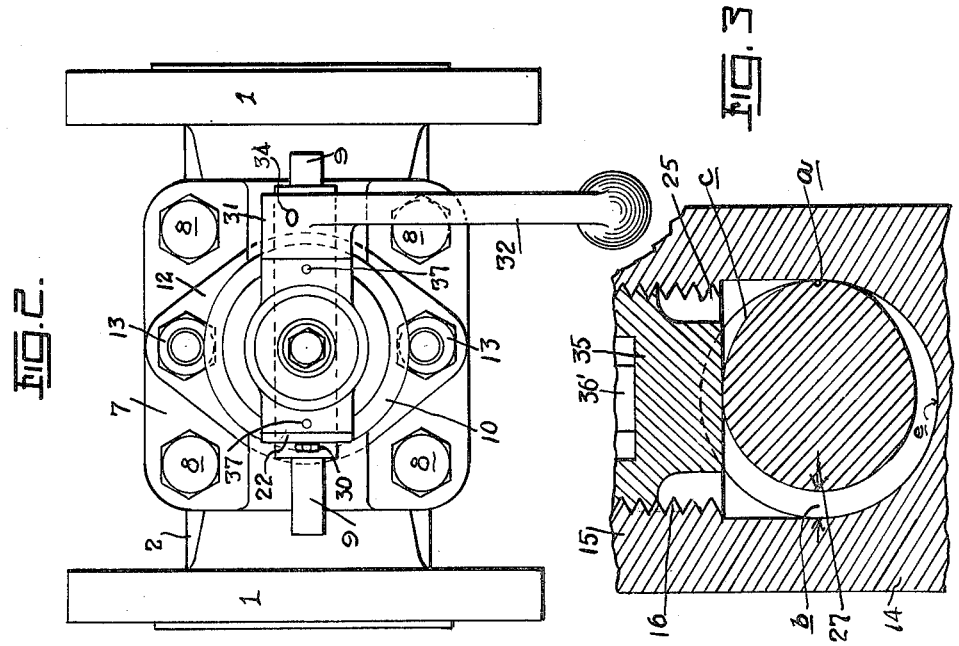
INVENTOR
OYSTEIN JACOBSEN,
BY
Toulmin & Toulmin
ATTORNEYS Patented Mar. 6, 1951

2,544,090

UNITED STATES PATENT OFFICE 2,544,090

PLUG VALVE

Oystein Jacobsen, Montgomery County, Ohio, assignor to The Duriron Company, Inc., Dayton, Ohio, a corporation of New York Application June 24, 1944, Serial No. 541,859

6 Claims. (Cl. 251—97)

The present invention relates to valves for controlling the flow of fluids and more particularly to those valves of the mechanical lift plug cock type.

The plug cock type of valve is satisfactory in operation especially in small installations but when such valve is used for the purpose of controlling large quantities of pressure fluid, thus necessitating rotating parts of considerable weight, difficulty has been encountered in operating the valve. The plug may adhere tenaciously to its seat due to a sticking or galling effect produced by the rubbing of the metallic surfaces; also by acid-containing liquids which precipitate nitrates or sulphates and cement the rotating parts.

Various methods and structures have been proposed by which to "loosen up" or "unfreeze" the plug and most of these expedients employ grease or lubricant through which pressure can be applied to the bottom surface of the plug. This arrangement is open to the objection that if there is any leakage between the various parts, it is difficult if not impossible, to apply pressure to the lubricant sufficient to raise the plug.

Still another arrangement which has been used to advantage is that obtained by a camming effect which forces the plug to be lifted mechanically from its seat and then the plug is allowed to drop back into its seat after turning to a new position when the camming effect is released. Sometimes springs are employed to force the plug downwardly as soon as possible after this element has been lifted and turned so as to reduce any tendency for leakage of the fluid past the plug seat. This arrangement has worked quite satisfactorily and the only disadvantage is due to the fact that springs are relied upon during the operation and these springs are apt to break over long periods of time. Moreover, when the downward urge is effected by a spring or springs, control of this downward movement or force is lost and the tightness with which the plug is caused to hug its seat is neither adjustable or controllable.

The primary object of the invention is to provide an improved valve construction of the type in which the plug must be lifted before the valve is turned to its on or off position and in which the lifting and depressing effects on the plug are under the absolute control of the operator.

Another object is to provide an improved plug cock valve in which the plug can be both lifted and depressed mechanically during the valve-on and valve-off operations without the use of springs or other compression or tension producing devices.

Other objects and features will be apparent when the specification is perused in connection with the accompanying drawings in which:

Fig. 1 represents a side elevational view of the improved valve with the parts directly concerned with the improvement in section.

Fig. 2 is a plan view looking down on the valve from the top, while:

Fig. 3 is an enlarged fragmentary sectional view taken along line 3—3 in Fig. 1.

Referring more particularly to Figures 1 and 2, reference character 1 represents the end flange portion of a coupling body 2. There is an opening indicated by dotted line 3 extending longitudinally of the body, the latter being provided with a downwardly extending portion 4 which serves as a sump for the oil or grease normally introduced between the plug 5 and its seat. The latter may take the form of a vertically positioned opening of conical shape, centrally disposed with respect of the coupling body and therefore communicating with the longitudinal opening 3. The plug 5 also has a conical shape and fits snugly but slidably within the conically shaped opening or seat.

There is a flange or plate member 6 integrally connected with the body 2, this plate being horizontal and having a rectangular configuration to serve as a support for the plate 7. The latter is secured to the flange 6 by bolts 8 and the member 7 constitutes the base portion of an upstanding bonnet having webbed structural members 9 terminating at the top in a vertically extending hub 10. The plate 7 and the part of the bonnet immediately above are provided with a relatively large opening which surrounds the plug stem to leave an annular space for receiving packing (not shown) which is pressed downwardly by a gland 11 and a pressure plate 12. Bolts 13 may be employed to apply pressure to the gland. The plate 12 has an opening therethrough for loosely receiving the stem 14 of the plug and the latter extends upwardly through the sleeve 10 and terminates at the top in a vertically extending bored portion indicated at 15 containing threads 16.

There is a sleeve 17 snugly but slidably supporting the plug stem 14, this sleeve being threaded at the bottom as indicated at 18 to receive a nut 19 which is provided with a radially extending set screw 20. This sleeve terminates at the top in a pair of outwardly extending circular projections or bosses 21. The bosses may have a circular shape at the top indicated at 22 and the bottom edge 23 has a horizontal flat shape. A sleeve 24 abuts the surface 23 of each boss and is threadingly received by the hub 10. The sleeve 24 fits slidably about the sleeve 17 and contacts with the nut 19. Thus the plug stem 14 is held in position within the hub 10 by reason of the intermediate sleeves 17 and 24.

The stem portion 15 is provided with a diametrically extending opening 25 in line with openings in the bosses 21 for receiving a cam rod 26. This rod is of circular shape but has a portion 27 at the middle which extends between the shoulders 28 and constitutes a cam as will be explained hereinafter. As shown in Fig. 3, the rod portion 27 is cut down over approximately ¾ of its circumference to a slightly smaller diameter than the end portions 26. The rod is held in position horizontally at one end by means of a washer 29 and a cotter pin 30 and at the other end by the hub 31 of a handle or lever 32. A pin 34 is driven through the hub and the shaft 26. Thus the latter is restrained from moving in one direction (Fig. 1) by the hub 31 and in the other direction by the washer 29 and cotter pin 30. It is apparent that the bosses 21 constitute journals or bearings for the shouldered or end portions of the rod 26 so that when the lever 32 is moved upwardly or downwardly the rod portions 26 and 27 are caused to rotate.

There is a pair of thimble shaped plugs 35 and 36, one contacting the other, and engaging the threads 16 within the stem 15, the lower plug 36 contacting the undercut cam surface of the rod 26. These plugs have a vertical hexagonal opening 36′ in order to receive a socket wrench and it is apparent that the upper of the two plugs serves to lock the lower plug.

In operation, assume that the lever 32 is in the horizontal position as shown and that it is desired to rotate the plug. The first step is to move the lever 32 upwardly to an angle of about 45° at which time the surface (a) of the portion 27 will cause a lifting effect at the lower surface of the lower plug 35. Inasmuch as this plug is threadingly engaged with the upper portion 15 of the plug stem, the stem will also be caused to elevate slightly to a height determined by the amount (b) (Fig. 3) by which the radius of the cammed surface (c) of the rod portion 27 is increased by the radius of portion a. This upward movement of the lever 32 to an approximately 45° angle breaks the seal between the plug 5 and its seat, permitting the plug and its stem to be rotated together with the sleeve 17 within a bearing formed by the sleeve 24. In other words, all of the structure beyond the sleeve 10 rotates except the sleeve 24 which is rigidly fixed within the bonnet. It will be noted that the lever 32 in addition to causing the elevation of the plug stem also serves as a convenient handle for rotating the plug stem.

Let us assume that the plug has been rotated to bring its valve opening into line with the opening 3 of the valve body.

In order that the plug shall re-engage its seat in its new position and thus prevent leakage about the plug, the lever 32 is now depressed past its horizontal position to a position approximately 45° below the horizontal at which time the circular part (a) of the rod portion 27 will strike the circular surface (e) of the stem portion 14 and cause the stem to be pressed downwardly. In order to close the valve the lever 32 is then moved upwardly through approximately 90° until it is in position at about 45° of the horizonal in order to free the plug and then the plug and its stem, also the entire upper structure with the exception of the sleeve 24 is turned by the lever through approximately 90° after which the lever is depressed to its lower position.

It is apparent that by reason of the camming portion 27, the plug stem portions 14, 15 are caused to be elevated prior to any rotary movement of the plug and then caused to be lowered after the valve has reached its new position. It is further apparent that by taking into consideration the taper of the plug and the shape of the cam 27, any rate or distance through which the plug is to be moved can be obtained by simply swinging the lever 32 upwardly or downwardly, and the arrangement is such that the lever will stay in the last set position. The improved structure provides for considerable adjustment of the various parts, for example, the lower nut 35 may be screwed down to any desired distance in order to regulate the instant during the turning movement of the rod portion 27 when the stem 14, 15 is caused to be lifted. Further adjustments can be obtained by manipulating the nut 19 after which its position is rigidly set by the set screw 20.

In order to reduce friction as much as possible about the rod bearing portions 26 which are journaled in the bosses 21, there may be provided openings 37 for a lubricant. Wear on the camming and bearing surfaces may be still further reduced by making the rod 26 of hardened steel and if desired the lower surface of the nut 35 may also be case-hardened.

The improved structure lends itself to facility of inspection and replacement of parts because the eccentric or camming portion 27 is smaller than the bearing openings within the bosses 21 so that by simply removing the cotter pin 30 and the washer 29 the entire camming rod and its lever can be taken out of its bearings and inspected or replaced. On account of the fact that the plug stem is elevated and lowered by the positive action of the cam 27 there is no need to apply pressure through a lubricant which is usually contained within the sump 4 and is normally adapted to press upwardly against plug 5. Moreover, springs are unnecessary to restore the plug to its down or seated position after the plug has been rotated because the eccentric 27 constantly exerts a positive thrust on the plug either in the upward or downward direction and holds the plug in that position until the lever is again moved.

It will be understood that I desire to comprehend within my invention such modifications as come within the scope of the claims and the invention.

Having thus fully described my invention, what I claim as new and desire to secure by Letters Patent is:

1. A valve for controlling the flow of fluid through a coupling, said coupling being provided with a main passageway and an angularly positioned bore communicating therewith, a plug within said bore adapted to rotate, a passageway extending laterally through said plug and adapted to register with the coupling passageway when the plug is rotated, a stem on said plug, a support extending vertically from said valve and surrounding said stem, a pair of sleeves, one of which is fixedly secured to the stem and is adapted to rotate within the other sleeve, said other sleeve being fixedly secured to said support, the first mentioned sleeve being provided with a pair of aligned bearings for receiving an eccentric element, a lever for operating said element and positioned out of coaxial alignment with said sleeves, said element being adapted to reciprocably move in the vertical direction and to contact a portion of the stem when rotated in one direction and to contact another portion of the stem when rotated in the opposite direction whereby the stem is elevated and lowered when the eccentric is rotated, means positioned in line with said sleeves for adjustably determining the amount of movement of said element in the vertical direction, said stem and eccentric being permitted to rotate in the horizontal direction due to the sliding fit between the first mentioned sleeve and the second mentioned sleeve forming part of said support when the plug is moved between its on and off positions.

2. A valve for controlling the flow of fluid through a coupling, said coupling being provided with a main passageway and an angularly positioned bore communicating therewith, a plug within said bore adapted to rotate, a passageway extending laterally through said plug and adapted to register with the coupling passageway when the plug is rotated, a stem on said plug, a support for said stem and secured to said valve, said stem terminating in a bored portion having threads, a nut engaging said threads, a horizontal opening through said stem and a cam rod extending through said opening in contact with said nut, said rod being journaled in said support whereby as the rod is rotated in one direction pressure is produced against said nut to elevate the stem and when the rod is rotated in the other direction pressure is exerted against said stem to lower the plug into its seat.

3. A valve for controlling the flow of fluid through a coupling, said coupling being provided with a main passageway and an angularly positioned bore communicating therewith, a plug within said bore adapted to rotate, a passageway extending laterally through said plug and adapted to register with the coupling passageway when the plug is rotated, a stem on said plug, said stem being supported in the vertical direction by means of a bonnet which terminates at the top in a threaded ring, a sleeve threadedly engaging said ring and containing a sleeve which fits snugly but rotatably within the first-mentioned sleeve, said second-mentioned sleeve containing the plug stem and being rigidly fixed to the stem from the rotational standpoint but permitting the stem to move in the vertical direction with respect to said sleeve, camming means extending through said stem and secured to said second-mentioned sleeve for raising and lowering the stem depending on the direction in which the cam is rotated, and means positioned in line with said stem for determining the maximum travel of the stem in the vertical direction, said camming means including a lever which controls the rotation of the cam and also serves to rotate the stem and said second-mentioned sleeve within the first-mentioned sleeve.

4. A valve for controlling the flow of fluid through a coupling, said coupling being provided with a main passageway and an angularly positioned bore communicating therewith, a plug within said bore adapted to rotate and terminating in a stem extending upwardly therefrom, a passageway extending laterally through said plug and adapted to register with a coupling passageway when the plug is rotated, an axial opening through the upper portion of the stem and terminating in a transversely extending opening at a position above the plug, a cylindrical member, said axial opening being adapted to receive said cylindrical member, and means for elevating and lowering the plug when the valve is being moved to its on and off positions, said means including a double-acting cam extending through the transverse opening of the stem to press against said cylindrical member when the cam is in one position and to press against the stem at the lower surface of the transverse opening when the cam is in the diametrically opposite position.

5. A valve for controlling the flow of fluid through a coupling, said coupling being provided with a main passageway and an angularly positioned bore communicating therewith, a plug within said bore adapted to rotate and terminating in a stem, a passageway extending laterally through said plug and adapted to register with a coupling passageway when the plug is rotated, an axial opening through the upper portion of the stem and terminating in a transversely extending opening at a position above the plug, a threaded cylindrical member, said axial opening being threaded in order to receive said threaded cylindrical member, and means for elevating and lowering the plug when the valve is being moved to its on and off position, said means including a double-acting cam extending through the transverse opening of the stem to press said cylindrical member when the cam is in one position and to press against the stem at the lower surface of the transverse opening when the cam is in the diametrically opposite position, said threaded cylindrical member being adjusted in its position within its axial opening in order to control the amount that the plug is lifted or depressed as the cam is moved from one position to the other position.

6. A valve for controlling the flow of fluid through a coupling, said coupling being provided with a main passageway and angularly positioned bore communicating therewith, a plug within said bore adapted to rotate and terminating in a stem, a passageway extending laterally through said plug and adapted to register with a coupling passageway when the plug is rotated, an axial opening through the upper portion of the stem and terminating in a transversely extending opening at a position above the plug, a pair of aligned cylindrical members having threaded surfaces, said axial opening being provided with threads in order to receive said cylindrical members, one mounted on the other to lock one another against rotation, and means for elevating and lowering the plug when the valve is being moved to its on and off positions, said means including a double-acting cam extending through the transverse opening of the stem to press against the lower surface of the lower cylindrical member when the cam is in one position and to press against the stem at the lower surface of the transverse opening when the cam is in the diametrically opposite position.

OYSTEIN JACOBSEN.

REFERENCES CITED

The following references are of record in the file of this patent:

UNITED STATES PATENTS

| Number | Name | Date |
| --- | --- | --- |
| 249,579 | Boyle | Nov. 15, 1881 |
| 2,005,128 | Bowes | June 18, 1935 |
| 2,071,814 | Brisbane | Feb. 23, 1937 |
| 2,093,692 | Daniels | Sept. 21, 1937 |
| 2,142,795 | McFarlane | Jan. 3, 1939 |